3,238,145
METHOD OF PREPARING CATALYST COMPOSITIONS FROM TITANIUM TETRACHLORIDE AND ORGANOALUMINUM COMPOUNDS
William E. Loeb, Martinsville, N.J., assignor to Union Carbide Corporation, a corporation of New York
No Drawing. Original application Nov. 10, 1960, Ser. No. 68,337. Divided and this application Dec. 23, 1963, Ser. No. 332,871
6 Claims. (Cl. 252—429)

This application is a divisional application of application Serial No. 68,337, entitled "Method of Preparing Catalyst Compositions Employed in the Polymerization of Ethylene," filed November 10, 1960, now abandoned.

This invention relates to improved methods of preparing catalyst compositions employed in the polymerization of ethylene.

It is known that ethylene can be polymerized by contacting it with a catalyst composition consisting of a compound of a transition metal of Group IVA, VA, or VIA of the Periodic Chart of the Atoms and an organometallic compound of a metal of Group IA, IIA, or IIIB of the Periodic Chart of the Atoms. The polyethylene prepared in accordance with such procedure usually has a wide molecular weight distribution, and in the case of polymer having a melt index or about one, usually contains from about eight percent by weight to about thirty percent by weight of resin having a molecular weight below about 10,000, and from about five percent by weight to about fifteen percent by weight of resin having a molecular weight above about 150,000. Very low molecular weight fractions are undesirable because they increase the bulk of the polymer without increasing its strength, and because such fractions tend to exude from the polymer. Very high molecular weight fractions are undesirable because they render the polymer difficult to process because of the undesirable rheological properties they impart thereto.

It has now been discovered that the amount of low molecular weight and high molecular weight resin fractions produced in the polymerization of ethylene can be substantially reduced by employing specially prepared three-component catalyst compositions comprising a monoorganoaluminum dichloride ($RAlCl_2$), titanium trichloride, and titanium tetrachloride. When ethylene is polymerized according to the instant invention by contacting it with such specially prepared catalyst compositions, the polyethylene obtained has a much narrower molecular weight distribution, i.e. has less low and less high molecular weight resin. This narrower molecular weight distribution helps to eliminate the problems described above, and imparts improved stress-crack resistance to the polymer.

According to the process of the instant invention, at least one of the components of the catalyst compositions employed in the polymerization of ethylene is prepared in situ. Thus, either the titanium trichloride component alone, or both the titanium trichloride component and the monoorganoaluminum dichloride ($RAlCl_2$) component, are prepared in situ. The final component is then added and the catalyst composition is ready for use.

Surprisingly, the molecular weight distribution of polyethylene obtained through the use of catalyst compositions produced in accordance with the process of the instant invention is considerably narrowed, and the amount of polymer having a molecular weight outside the range of 10,000 to 150,000 is from 10 percent by weight to 40 percent by weight less than it is for polyethylene prepared in accordance with the prior art procedure described above.

In accordance with one aspect of the instant invention, both the monoorganoaluminum dichloride ($RAlCl_2$) component and the titanium trichloride component are prepared in situ by the reduction of titanium tetrachloride with either a triorganoluminum compound ($RA_3Al$) of a diorganoaluminum chloride ($R_2AlCl$). Additional titanium tetrachloride is then added and the catalyst composition is ready for use.

In accordance with a second aspect of this invention, the titanium trichloride component alone is prepared in situ by the partial reduction of an excess of titanium tetrachloride with a triorganoaluminum compound ($R_3Al$), a diorganoaluminum chloride ($R_2AlCl$), or a monoorganoaluminum dichloride ($RAlCl_2$). Since an excess of titanium tetrachloride is employed, it is only partially reduced, and since titanium trichloride is produced in situ, it is then only necessary to add a monoorganoaluminum dichloride ($RAlCl_2$) to prepare the catalyst composition for use.

When both the monoorganoaluminum dichloride ($RAlCl_2$) and the titanium trichloride components are prepared in situ, a triorganoaluminum compound ($R_3Al$), or a diorganoaluminum chloride ($R_2AlCl$), is reacted with titanium tetrachloride in an inert liquid hydrocarbon which serves as diluent. Theoretically the reactions proceed according to the following equations:

(1) $R_3Al + 2TiCl_4 \rightarrow RAlCl_2 + 2TiCl_3 + 2R\cdot$
(2) $R_2AlCl + TiCl_4 \rightarrow RAlCl_2 + TiCl_3 + R\cdot$ wherein R is a monovalent hydrocarbon radical free of aliphatic unsaturation having from one to about eighteen carbon atoms.

When only the titanium trichloride component is prepared in situ, an excess of titanium tetrachloride is reacted with a triorganoaluminum compound ($R_3Al$), a diorganoaluminum chloride ($R_2AlCl$), or a monoorganoaluminum dichloride ($RAlCl_2$) in an inert liquid hydrocarbon. The reactions under these circumstances theoretically proceed according to the following equations:

(3) $R_3Al + 4TiCl_4 \longrightarrow 3TiCl_3 + AlCl_3 + TiCl_4 + 3R\cdot$
(excess)

(4) $R_2AlCl + 3TiCl_4 \longrightarrow 2TiCl_3 + AlCl_3 + TiCl_4 + 2R\cdot$
(excess)

(5) $RAlCl_2 + 2TiCl_4 \longrightarrow TiCl_3 + AlCl_3 + TiCl_4 + R\cdot$
(excess)

wherein R is a monovalent hydrocarbon radical free of aliphatic unsaturation having from one to about eighteen carbon atoms.

One of the components of the specially prepared catalyst compositions of the instant invention is titanium trichloride. As previously indicated, the titanium trichloride component is in all instances prepared in situ, either alone, or together with the monoorganoaluminum dichloride (RAlCl$_2$) component. When only the titanium trichloride component is prepared in situ, an excess of titanium tetrachloride is partially reduced with a triorganoaluminum compound (R$_3$Al), a diorganoaluminum chloride (R$_2$AlCl), or a monoorganoaluminum dichloride (RAlCl$_2$), thus necessitating the addition of a monoorganoaluminum dichloride (RAlCl$_2$) in order to complete the catalyst composition. When the monoorganoaluminum dichloride (RAlCl$_2$) component is prepared in situ along with the titanium trichloride component, titanium tetrachloride is first reduced with a triorganoaluminum compound (R$_3$Al) or a diorganoaluminum chloride (R$_2$AlCl), and additional titanium tetrachloride is added to complete the catalyst composition.

The second component of the specially prepared catalyst compositions of the instant invention is titanium tetrachloride. Titanium tetrachloride, besides comprising an essential component of the catalyst composition, is also employed in the in situ preparation of the titanium trichloride component, or both the titanium trichloride and monoorganoaluminum dichloride (RAlCl$_2$) components, as explained above.

The third component of the specially prepared catalyst compositions of the instant invention is a monoorganoaluminum dichloride (RAlCl$_2$) wherein the organo radical (R) is a monovalent hydrocarbon radical free of aliphatic unsaturation having from one to about eighteen carbon atoms, including alkyl radicals such as methyl, ethyl, propyl, isopropyl, butyl, isobutyl, amyl, octadecyl and the like, and aryl radicals such as phenyl, tolyl, xylyl, naphthyl and the like. Preferably the organo radical is an alkyl radical having from two to twelve carbon atoms. Illustrative of such monoorganoaluminum dichlorides (RAlCl$_2$) are such compounds as isobutylaluminum dichloride, octylaluminum dichloride, butylaluminum dichloride, ethylaluminum dichloride, isopropylaluminum dichloride, dodecylaluminum dichloride, octadecylaluminum dichloride, methylaluminum dichloride, phenylaluminum dichloride, tolylaluminum dichloride, xylylaluminum dichloride and the like.

As previously indicated, the monoorganoaluminum dichloride (RAlCl$_2$) component can be prepared in situ, along with titanium trichloride, by reacting a triorganoaluminum compound (R$_3$Al), or a diorganoaluminum chloride (R$_2$AlCl), with titanium tetrachloride. When only the titanium trichloride component is prepared in situ by the reaction of an excess of titanium tetrachloride with a triorganoaluminum compound (R$_3$Al), a diorganoaluminum chloride (R$_2$AlCl), or a monoorganoaluminum dichloride (RAlCl$_2$), it is then necessary to further add monoorganoaluminum dichloride (RAlCl$_2$) in order to complete the catalyst composition.

The triorganoaluminum compounds (R$_3$Al) suitable for use in the in situ preparation of the titanium trichloride component, or both the titanium trichloride and the monoorganoaluminum dichloride components, are those wherein the organo radicals (R) are monovalent hydrocarbon radicals free of aliphatic unsaturation having from one to about eighteen carbon atoms, including alkyl radicals such as methyl, ethyl, propyl, isopropyl, butyl, isobutyl, amyl, octadecyl and the like, and aryl radicals such as phenyl, tolyl, xylyl, naphthyl and the like. Preferably the organo radicals are alkyl radicals having from two to twelve carbon atoms. Illustrations of such triorganoaluminum compounds are such compounds as trimethylaluminum, triisobutylaluminum, trioctylaluminum, tri-n-butylaluminum, triethylaluminum, triisopropylaluminum, tridodecylaluminum, trioctadecylaluminum, diethylmethylaluminum, diethylisobutylaluminum, diisobutylethylaluminum, triphenylaluminum, tritolylaluminum, trixylylaluminum and the like.

The diorganoaluminum chlorides (R$_2$AlCl) suitable for use in the in situ preparation of the titanium trichloride component, or both the titanium trichloride and the monoorganoaluminum dichloride (RAlCl$_2$) components, are those wherein the organo radicals (R) are monovalent hydrocarbon radicals free of aliphatic unsaturation having from one to about eighteen carbon atoms including alkyl radicals such as methyl, ethyl, propyl, isopropyl, butyl, isobutyl, amyl, octadecyl and the like, and aryl radicals such as phenyl, tolyl, xylyl, naphthyl and the like. Preferably the organo radicals are alkyl radicals having from two to twelve carbon atoms. Illustrative of such diorganoaluminum chlorides are such compounds as dimethylaluminum chloride, diethylaluminum chloride, di-n-butylaluminum chloride, diisobutylaluminum chloride, dioctylaluminum chloride, diisopropylaluminum chloride, didodecylaluminum chloride, dioctadecylaluminum chloride, ethylmethylaluminum chloride, ethylisobutylaluminum chloride, diphenylaluminum chloride, ditolylaluminum chloride, dixylylaluminum chloride and the like.

When both the monoorganoaluminum dichloride (RAlCl$_2$) and titanium trichloride components are prepared in situ by the reduction of titanium tetrachloride with a triorganoaluminum compound (R$_3$Al), as illustrated by Equation 1 above, a molar ratio of triorganoaluminum compound (R$_3$Al) to titanium tetrachloride of 1:2 is necessary to completely reduce the titanium tetrachloride to titanium trichloride, and completely react the triorganoaluminum compound (R$_3$Al). If desired, an excess of triorganoaluminum compound (R$_3$Al) of up to one mole percent over the amount required to completely reduce the titanium tetrachloride to titanium trichloride can be employed. The addition of titanium tetrachloride to the reaction mixture containing titanium trichloride and monoorganoaluminum dichloride (RAlCl$_2$) then renders the catalyst composition ready for use. The additional titanium tetrachloride should be employed in a molar ratio of from about 5:1 to about 1:20, preferably from about 3:1 to about 1:10, based on the molar concentration of triorganoaluminum compound (R$_3$Al) originally employed.

When both the monoorganoaluminum dichloride (RAlCl$_2$) and titanium trichloride components are prepared in situ by the reduction of titanium tetrachloride with a diorganoaluminum chloride (R$_2$AlCl), as illustrated by Equation 2 above, a molar ratio of diorganoaluminum chloride (R$_2$AlCl) to titanium tetrachloride of 1:1 is necessary to completely reduce the titanium tetrachloride to titanium trichloride, and completely react the diorganoaluminum chloride (R$_2$AlCl). If desired, an excess of diorganoaluminum chloride (R$_2$AlCl) of up to one mole percent over the amount required to completely reduce the titanium tetrachloride to titanium trichloride can be employed. The addition of titanium tetrachloride to the reaction mixture containing titanium trichloride and monoorganoaluminum dichloride (RAlCl$_2$) then renders the catalyst composition ready for use. The additional titanium tetrachloride should be employed in a molar ratio of from about 5:1 to about 1:20, preferably from about 3:1 to about 1:10, based on the molar concentration of diorganoaluminum chloride (R$_2$AlCl) originally employed.

When the titanium trichloride component alone is prepared in situ by the reduction of titanium tetrachloride with a triorganoaluminum compound (R$_3$Al), as illustrated by Equation 3 above, a molar ratio of titanium tetrachloride to triorganoaluminum compound (R$_3$Al) of more than 3:1 is needed to completely react the triorganoaluminum compound (R$_3$Al) and still provide for an excess of titanium tetrachloride. In general, the titanium tetrachloride should be employed in a molar ratio of from more than 3:1 to about 10:1, preferably from about 4:1 to about 6:1, based on the triorganoaluminum compound (R$_3$Al) employed. The addition of a monoorganoaluminum dichloride (RAlCl$_2$) to the reaction mixture containing titanium trichloride and unreacted titanium tetrachloride then renders the catalyst composition ready for use. The monoorganoaluminum dichloride ($RAlCl_2$) should be employed in a molar ratio of from about 0.1:1 to about 10:1, preferably from about 0.5:1 to about 4:1, based on the excess titanium tetrachloride employed.

When the titanium trichloride component alone is prepared in situ by the reduction of titanium tetrachloride with a diorganoaluminum chloride ($R_2AlCl$), as illustrated by Equation 4 above, a molar ratio of titanium tetrachloride to diorganoaluminum chloride ($R_2AlCl$) of more than 2:1 is needed to completely react the diorganoaluminum chloride ($R_2AlCl$) and still provide for an excess of titanium tetrachloride. In general, the titanium tetrachloride should be employed in a molar ratio of from more than 2:1 to about 10:1, preferably from about 3:1 to about 5:1, based on the diorganoaluminum chloride ($R_2AlCl$) employed. The addition of a monoorganoaluminum dichloride ($RAlCl_2$) to the reaction mixture containing titanium trichloride and unreacted titanium tetrachloride then renders the catalyst composition ready for use. The monoorganoaluminum dichloride ($RAlCl_2$) should be employed in a molar ratio of from about 0.1:1 to about 10:1, preferably from about 0.5:1 to about 4:1, based on the excess titanium tetrachloride employed.

When the titanium trichloride component alone is prepared in situ by the reduction of titanium tetrachloride with a monoorganoaluminum dichloride ($RAlCl_2$), as illustrated by Equation 5 above, a molar ratio of titanium tetrachloride to monoorganoaluminum dichloroide ($RAlCl_2$) of more than 1:1 is needed to completely react the monoorganoaluminum dichloride ($RAlCl_2$) and still provide for an excess of titanium tetrachloride. In general, the titanium tetrachloride should be employed in a molar ratio of from more than 1:1 to about 10:1, preferably from about 1.5:1 to about 3:1, based on the original monoorganoaluminum dichloride ($RAlCl_2$) employed. The addition of additional monoorganoaluminum dichloride ($RAlCl_2$) to the reaction mixture containing titanium trichloride and unreacted titanium tetrachloride then renders the catalyst composition ready for use. The additional monoorganoaluminum dichloride ($RAlCl_2$) should be employed in a molar ratio of from about 0.1:1 to about 10:1, preferably from about 0.5:1 to about 4:1, based on the excess titanium tetrachloride employed.

The temperatures employed in the in situ preparation of the component(s) of the catalyst compositions of the instant invention can vary over a wide range. Thus, the titanium trichloride component, or the titanium trichloride and monoorganoaluminum dichloride ($RAlCl_2$) components, can be prepared in situ at temperatures ranging from as low as about 10° C. to as high as about 100° C., preferably from about 55° C. to about 85° C. Temperatures in the upper portion of the broadly disclosed range are favored when only small amounts of organoaluminum compounds and titanium chlorides are present in the diluent. When the theoretical amount of titanium trichloride has been formed (according to Equations 1 through 5 above), the final component of the catalyst composition is added at a convenient temperature, for example at a temperature of from about 10° C. to about 100° C., preferably from about 25° C. to about 90° C., and the catalyst composition is ready for use. The point at which the theoretical amount of titanium trichloride has been formed can be determined by analyzing aliquots of the mixture for $Ti^{+++}$ ions by adding a measured amount of ferric sulfate (sufficient to oxidize all the $Ti^{+++}$ ions present to $Ti^{++++}$ ions), and then titrating the $Fe^{++}$ ions produced on such addition to $Fe^{+++}$ ions with a standard solution of potassium permanganate.

The time necessary to produce the theoretical amount of titanium trichloride will depend upon such conditions as the temperature and the concentration of organoaluminum compounds and titanium chlorides present in the diluent. At high temperatures and/or concentrations, shorter periods of time are necessary than are required at lower temperatures and/or concentrations. Preferably, the conditions of temperature and concentration are such that the theoretical amount of titanium trichloride will be produced in a period of time of from about one-half hour to about one and one-half hours; however, periods of time of from less than fifteen minutes to more than several hours are sometimes necessary.

The inert liquid hydrocarbons which serve as diluents in the preparation of the catalyst compositions according to the process of the instant invention also serve as diluents for the polymerization reaction. By an inert liquid hydrocarbon is meant a liquid hydrocarbon which is nonreactive under the conditions employed in the preparation of the catalyst composition and in the polymerization of ethylene according to the process of the instant invention. While the hydrocarbons selected need not function as solvent for the catalyst composition or the polymers obtained by the process of the invention, they usually serve as solvent for the ethylene monomer employed in the polymerization. Among the inert liquid hydrocarbons applicable for such purpose may be mentioned saturated aliphatic hydrocarbons such as hexane, heptane, isooctane, highly purified kerosene, and the like; saturated cycloaliphatic hydrocarbons such as cyclohexane, methylcyclohexane, and the like; aromatic hydrocarbons such as benzene, toluene, xylene, and the like; and chlorinated aromatic hydrocarbons such as chlorobenzene, orthodichlorobenzene, and the like.

The total amount of inert liquid hydrocarbon employed as diluent in the in situ preparation of the component(s) of the catalyst compositions of the instant invention can vary over a wide range. In general, the organoaluminum compound and titanium tetrachloride starting materials employed in the in situ preparation should be admixed in sufficient diluent to provide a total concentration of such compounds of from about 0.005 mole to about 0.5 mole, preferably from about 0.02 mole to about 0.1 mole, per liter of diluent. While these starting materials can be mixed in any desired order, it is preferable to add the organoaluminum compound to the titanium tetrachloride.

After the in situ preparation of the titanium trichloride component, or the titanium trichloride and the organoaluminum dichloride components, is complete, the final component is added and the catalyst composition is ready for use. If desired, the catalyst composition can be further diluted with additional diluent before being employed in the polymerization of ethylene. The total amount of diluent employed in the polymerization can vary over a wide range. In general, a sufficient amount of diluent should be employed to provide a total concentration of all original starting materials of from about 0.005 mole to about 0.5 mole, preferably from about 0.01 mole to about 0.05 mole, per liter of diluent. While polymerization proceeds at concentrations outside the limits of the broadly disclosed range, no commensurate advantages are obtained by employing such concentrations.

The amount of catalyst composition employed in polymerizing ethylene according to the process of the instant invention can vary over a wide range. In general, such catalyst composition should be employed in an amount of from about 0.2 percent by weight to about 20 percent by weight, preferably from about 0.5 percent by weight to about 2 percent by weight, based on the total amount of ethylene monomer to be employed. While polymerization proceeds at concentrations outside the limits of the broadly disclosed range, no commensurate advantages are obtained by employing such concentrations.

Polymerization of ethylene to polymers having a narrow molecular weight distribution can be effected by contacting ethylene, either in the liquid or gaseous state, with the specially prepared catalyst compositions of the instant invention. By way of illustration, polymerization can be effected by continuously bubbling gaseous ethylene through the catalyst composition. Polymerization can also be effected by initially sealing a fixed amount of either the liquid or gaseous monomer in a polymerization reactor with the catalyst composition and allowing the reaction to proceed under autogenous pressure, with, if desired, further batchwise additions of monomer. In any event, reactive contact between the monomer and catalyst composition should be maintained by constant stirring or agitation of the reaction mixture. Care should be taken to exclude air and moisture from contact with the reaction mixture since these substances ordinarily interfere with polymerization. Such can be accomplished by techniques well known in the art.

The pressures employed in effecting polymerization with the specially prepared catalyst compositions of the instant invention can vary over a wide range. Polymerization is preferably effected at pressures ranging from about 1.0 atmosphere to about 20 atmospheres; however, pressures both above and below the disclosed preferred range, for example pressures ranging from as low as 0.1 atmosphere to as high as 50 atmospheres, or higher, can also be employed whenever it is desirable to do so.

Polymerization of ethylene with the specially prepared catalyst compositions of the instant invention readily occurs at temperatures ranging from as low as about 0° C. to as high as about 150° C., but is preferably effected at temperatures ranging from about 35° C. to about 95° C. Temperatures both above and below the broadly disclosed range can also be employed; however, no commensurate advantages are obtained by employed temperatures outside the limits of the broadly disclosed range.

After the polymerization reaction is complete, the catalyst composition can be inactivated by the addition thereto of a suitable quenching agent, such as, for example, isopropanol. The polymer formed by the reaction can then be separated from the reaction mixture by conventional procedures. As the polymer is generally insoluble in the reaction mixture, separation can usually be readily accomplished by filtration. Catalyst residues can be further removed from the polymer by washing with suitable solvents, as is known in the art.

The polyethylene produced in accordance with the instant invention can be employed in the many uses commonly made of such material, such as in the production of fibers, films, coatings, molded articles and the like.

The term "melt index," as employed throughout this specification, is the rate at which a polymer is extruded through a die having a diameter of 0.0825 inch in accordance with the procedure described in ASTM test procedure D-1238-52T. Polymers of high molecular weight extrude more slowly and therefore have a lower melt index.

The term "stiffness," as employed throughout this specification, refers to the secant modulus of elasticity of a polymer as measured on an Instron Tester. This tester is manufactured by the Instron Engineering Company, of Quincy, Mass. (Model TTB). The stiffness modulus is calculated by multiplying by 100 the force in pounds per square inch necessary to stretch a sample of the polymer, having a cross sectional area of one square inch, one percent of its original length at a rate of one percent per minute.

Unless otherwise specified, all parts and percentages, as used throughout this specification, are by weight. The Periodic Chart of the Atoms referred to throughout this specification is the 1956 Revised Edition published by W. M. Welch Manufacturing Company, 1515 Sedgwick Street, Chicago, Illinois, U.S.A.

The following examples are set forth for purposes of illustration so that those skilled in the art may better understand this invention, and it should be understood that they are not to be construed as limiting this invention in any manner. The molecular weight distribution of the polymers prepared in accordance with the following examples was determined by fractional extraction of the polymers with mixtures of xylene and Cellosolve (2-ethoxyethanol, manufactured by Union Carbide Corp., New York, N.Y.). The apparatus employed consisted of a column of sand about 10 inches in height supported on a glass frit in a tube within a vapor jacket containing butyl acetate. The butyl acetate was heated to its boiling temperature (126° C.), and a solution of 1.2 grams of polyethylene resin in boiling xylene was added to the sand column while nitrogen pressure was applied to hold the xylene solution up in the sand. The xylene was then allowed to cool to room temperature and the polyethylene resin precipitated in a finely divided state on the sand. After removing the xylene, the precipitated resin was then extracted by allowing 100 milliliter portions of mixtures of xylene and Cellosolve to trickle through the sand and resin while the butyl acetate was refluxing in the vapor jacket. The portions varied in composition from 30 weight percent to 100 weight percent of xylene. Each sample contained increasingly higher molecular weight fractions of the polyethylene resin. The amount of resin present in each sample was determined by removing the solvent therefrom by evaporation and weighing the remaining resin. The reduced viscosity of each resin fraction was then determined and plotted against the cumulative weight percent of extracted resin in order to illustrate the molecular weight distribution. The curve obtained was collated with a curve obtained in a similar manner from polyethylene having a similar melt index, but prepared with a two-component catalyst composition, in order to compare the molecular weight distribution of polymers obtained from the two systems. The comparison demonstrated that the molecular weight distribution of polyethylene prepared by using the specially prepared three-component catalyst system of the instant invention is narrower than the molecular weight distribution of polyethylene prepared by using a two-component catalyst system.

Reduced viscosity ($I_R$) is a measure of the molecular weight of a polymer, and can be defined by the equation:

$$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution. Measurements were made at 135° C. using Decalin as solvent, and a solution of 0.1 gram of polymer per 100 milliliters of solution.

EXAMPLE I

To a one-liter, round-bottomed flask equipped with an agitator, a thermometer, a brine-cooled condenser, and inlet and outlet tubes, were charged 500 milliliters of anhydrous isooctane that had been distilled in the presence of sodium. After purging the interior of the flask with anhydrous nitrogen, 5.00 milliliters of titanium tetrachloride (8.63 grams, 0.0454 mole) were added thereto. The contents of the flask were heated to 70° C. by means of an infra-red heating lamp, and maintained at this temperature while 10.0 milliliters of diisobutylaluminum chloride (8.60 grams, 0.0485 mole) were added thereto. The mixture turned progressively darker while being stirred and a precipitate formed. From time to time, measured aliquots were withdrawn from the flask and analyzed for $Ti^{+++}$ ions by adding thereto a measured amount of a saturated solution of ferric sulfate in 10 percent sulfuric acid (sufficient to oxidize all the $Ti^{+++}$ ions present to $Ti^{++++}$ ions), and then titrating the $Fe^{++}$ ions produced on such addition to $Fe^{+++}$ ions with a standard solution of potassium permanganate. These repeated titrations demonstrated that a period of approximately 45 minutes was necessary to effect complete reaction between the diisobutylaluminum chloride and the titanium tetrachloride, and to completely reduce the tetravalent titanium to the trivalent state.

To a nitrogen-purged three-liter polymerization reactor equipped with a stirrer, a thermowell with thermocouple, three inlet tubes and an exhaust tube, were charged, 100 milliliters of the mixture prepared in accordance with the above procedure and 900 milliliters of anhydrous isooctane. The resulting mixture was stirred and heated at 50° C. while 0.33 milliliter of titanium tetrachloride (0.57 gram, 0.003 mole) was added thereto. Anhydrous ethylene gas was then sparged through the mixture at the rate of 6.0 cubic feet per hour at a temperature of from 50–60° C. The reaction was allowed to proceed for 20 minutes, during which time a total of 62 grams of ethylene were fed into the reactor. At the end of this time, the ethylene flow was discontinued and 250 milliliters of isopropanol were added to the mixture to inactivate the catalyst. The polyethylene produced was separated by filtration. The polyethylene was then boiled in isopropanol, separated by filtration, and dried overnight in a forced draft oven at a temperature of 60° C. The dried polyethylene weighed 29 grams, representing a yield of 47 percent of theoretical. The polyethylene had a melt index of 0.10 decigram per minute, a stiffness of 61,000 p.s.i. at room temperature, a density of 0.9455 gram per milliliter at 23° C., and a reduced viscosity of 3.80.

A portion of the polyethylene was fractionally extracted in the manner described above, and the weight and reduced viscosity of each fraction was determined. Table A below summarizes the results obtained. The reduced viscosity of each fraction was then plotted against the cumulative weight percent of extracted polyethylene in order to illustrate the molecular weight distribution of the polymer. By comparing the curve obtained to a curve obtained in a similar manner from polyethylene having a similar melt index, and prepared in a similar manner with a two-component catalyst composition consisting of triisobutylaluminum and titanium tetrachloride, it is obvious that the molecular weight distribution of polyethylene prepared by using the specially prepared three-component catalyst system of the instant invention is narrower than the molecular weight distribution of polyethylene prepared by using a two-component catalyst system.

Table B below summarizes the data employed in preparing the curve for the polyethylene prepared by using the two-component catalyst system. By comparing Table A with Table B it is obvious that polyethylene prepared by using the specially prepared three-component catalyst system of the instant invention contains less resin having a very low or a very high reduced viscosity than does polyethylene prepared by using a two-component catalyst system.

*Table A*

| Fraction | Composition of Extracting Solvent (weight percent) | Reduced Viscosity of Fraction | Cumulative Weight Percent of Extracted Polyethylene |
|---|---|---|---|
| 1 | 30% xylene, 70% Cellosolve | 0.23 | 6.04 |
| 2 | 40% xylene, 60% Cellosolve | | 15.18 |
| 3 | 45% xylene, 55% Cellosolve | 0.46 | 20.96 |
| 4 | 50% xylene, 50% Cellosolve | 0.53 | 27.15 |
| 5 | 55% xylene, 45% Cellosolve | 0.74 | 36.53 |
| 6 | 60% xylene, 40% Cellosolve | 1.33 | 51.34 |
| 7 | 65% xylene, 35% Cellosolve | 4.17 | 72.95 |
| 8 | 70% xylene, 30% Cellosolve | 8.30 | 90.95 |
| 9 | 100% xylene, 0% Cellosolve | 8.36 | 98.09 |

*Table B*

| Fraction | Composition of Extracting Solvent (weight percent) | Reduced Viscosity of Fraction | Cumulative Weight Percent of Extracted Polyethylene |
|---|---|---|---|
| 1 | 30% xylene, 70% Cellosolve | 0.11 | 11.65 |
| 2 | 40% xylene, 60% Cellosolve | 0.23 | 18.64 |
| 3 | 45% xylene, 55% Cellosolve | 0.42 | 26.48 |
| 4 | 50% xylene, 50% Cellosolve | 0.57 | 37.71 |
| 5 | 55% xylene, 45% Cellosolve | 1.10 | 54.91 |
| 6 | 60% xylene, 40% Cellosolve | 2.70 | 73.29 |
| 7 | 65% xylene, 35% Cellosolve | 6.44 | 88.55 |
| 8 | 70% xylene, 30% Cellosolve | 13.10 | 96.80 |
| 9 | 100% xylene, 0% Cellosolve | 18.60 | 98.94 |

EXAMPLE II

The procedure described in Example I was repeated by originally reacting 0.0912 mole of titanium tetrachloride with 0.0988 mole of diisobutylaluminum chloride in one liter of isooctane to reduce the titanium tetrachloride to titanium trichloride, and then adding 0.010 mole of titanium tetrachloride to a 100 milliliter portion thereof which had been diluted with 900 milliliters of isooctane. The polyethylene recovered weighed 36 grams, representing a yield of 58 percent of theoretical. The polyethylene had a melt index of 0.14 decigram per minute, a stiffness of 64,000 p.s.i. at room temperature, and a reduced viscosity of 2.96.

A portion of the polyethylene was fractionally extracted in the manner described above, and the weight and reduced viscosity of each fraction was determined. Table C below summarizes the results obtained. The reduced viscosity of each fraction was then plotted against the cumulative weight percent of extracted polyethylene in order to illustrate the molecular weight distribution of the polymer.

By comparing Table C below with Table B above it is obvious that polyethylene prepared by using the specially prepared three-component catalyst system of the instant invention contains less resin having a very low or a very high reduced viscosity than does polyethylene prepared by using a two-component catalyst system. This indicates that the molecular weight distribution of polyethylene prepared by using the specially prepared three-component catalyst system of the instant invention is narrower than the molecular weight distribution of polyethylene prepared by using a two-component catalyst system.

Table C

| Fraction | Composition of Extracting Solvent (weight percent) | Reduced Viscosity of Fraction | Cumulative Weight Percent of Extracted Polyethylene |
|---|---|---|---|
| 1 | 30% xylene, 70% Cellosolve | 0.22 | 7.19 |
| 2 | 40% xylene, 60% Cellosolve | 0.33 | 11.38 |
| 3 | 45% xylene, 55% Cellosolve | 0.43 | 15.99 |
| 4 | 50% xylene, 50% Cellosolve | 0.66 | 24.58 |
| 5 | 55% xylene, 45% Cellosolve | 1.62 | 38.54 |
| 6 | 60% xylene, 40% Cellosolve | 2.12 | 57.51 |
| 7 | 65% xylene, 35% Cellosolve | 5.37 | 77.60 |
| 8 | 70% xylene, 30% Cellosolve | 7.50 | 92.22 |
| 9 | 100% xylene, 0% Cellosolve | 4.86 | 98.34 |

EXAMPLE III

To the nitrogen-purged reactor described in Example I were added 200 milliliters of anhydrous isooctane. After heating the isooctane to 70° C., 1.1 milliliter of titanium tetrachloride (1.0 gram, 0.010 mole) and 2.06 milliliters of diisobutylaluminum chloride (1.8 gram, 0.010 mole) were added thereto, in that order, and the resulting mixture was maintained at 70° C. for one hour in order to reduce the titanium tetrachloride to titanium trichloride. At the end of this time, 800 milliliters of anhydrous isooctane were added, causing the temperature of the resulting mixture to fall to 45° C. After the addition of 0.33 milliliter of titanium tetrachloride (0.57 gram, 0.003 mole), anhydrous ethylene gas was sparged through the mixture at the rate of 6.0 cubic feet per hour at a temperature of from 50° C. to 57° C. The reaction was allowed to proceed for 20 minutes, during which time a total of 62 grams of ethylene were fed into the reactor. At the end of this time, the ethylene flow was discontinued and 250 milliliters of isopropanol were added to the mixture to inactivate the catalyst. The polyethylene produced was separated by filtration. This polyethylene was then boiled in isopropanol, separated by filtration, and dried overnight in a forced draft oven at a temperature of 60° C. The dried polyethylene weighed 46 grams, representing a yield of 74 percent of theoretical. The polyethylene had a melt index of 0.09 decigram per minute, a stiffness of 64,000 p.s.i. at room temperature, and a reduced viscosity of 3.32.

A portion of the polyethylene was fractionally extracted in the manner described above, and the weight and reduced viscosity of each fraction was determined. Table D below summarizes the results obtained. The reduced viscosity of each fraction was then plotted against the cumulative weight percent of extracted polyethylene in order to illustrate the molecular weight distribution of the polymer.

By comparing Table D below with Table B above it is obvious that polyethylene prepared by using the specially prepared three-component catalyst system of the instant invention contains less resin having a very low or a very high reduced viscosity than does polyethylene prepared by using a two-component catalyst system. This indicates that the molecular weight distribution of polyethylene prepared by using the specially prepared three-component catalyst system of the instant invention is narower than the molecular weight distribution of polyethylene prepared by using a two-component catalyst system.

Table D

| Fraction | Composition of Extracting Solvent (weight percent) | Reduced Viscosity of Fraction | Cumulative Weight Percent of Extracted Polyethylene |
|---|---|---|---|
| 1 | 30% xylene, 70% Cellosolve | 0.29 | 9.38 |
| 2 | 40% xylene, 60% Cellosolve | 0.37 | 14.95 |
| 3 | 45% xylene, 55% Cellosolve | 0.50 | 21.92 |
| 4 | 50% xylene, 50% Cellosolve | 0.81 | 31.33 |
| 5 | 55% xylene, 45% Cellosolve | 1.18 | 47.85 |
| 6 | 60% xylene, 40% Cellosolve | 3.95 | 71.53 |
| 7 | 65% xylene, 35% Cellosolve | 5.15 | 89.68 |
| 8 | 70% xylene, 30% Cellosolve | 7.50 | 96.84 |
| 9 | 100% xylene, 0% Cellosolve | 6.07 | 99.16 |

EXAMPLE IV

The procedure described in Example III was repeated by originally reacting 0.020 mole of titanium tetrachloride with 0.020 mole of diisobutylaluminum chloride to reduce the titanium tetrachloride to titanium trichloride, and then adding 0.020 mole of titanium tetrachloride. The polyethylene recovered weighed 60 grams, representing a yield of 97 percent of theoretical. The polyethylene had a melt index of 0.48 decigram per minute, a stiffness of 65,000 p.s.i. at room temperature, and a reduced viscosity of 2.52.

A portion of the polyethylene was fractionally extracted in the manner described above, and the weight and reduced viscosity of each fraction was determined. Table E below summarizes the results obtained. The reduced viscosity of each fraction was then plotted against the cumulative weight percent of extracted polyethylene in order to illustrate the molecular weight distribution of the polymer. By comparing the curve obtained to a curve obtained in a similar manner from polyethylene having a similar melt index, and prepared in a similar manner with a two-component catalyst composition consisting of triisobutylaluminum and titanium tetrachloride, it is once again obvious that the molecular weight distribution of polyethylene prepared by using the specially prepared three-component catalyst system of the instant invention is narrower than the molecular weight distribution of polyethylene prepared by using a two-component catalyst system.

Table F below summarizes the data employed in preparing the curve for the polyethylene prepared by using the two-component catalyst system. By comparing Table E with Table F it is obvious that polyethylene prepared by using the specially prepared three-component catalyst system of the instant invention contains less resin having a very low or a very high reduced viscosity than does polyethylene prepared by using a two-component catalyst system.

Table E

| Fraction | Composition of Extracting Solvent (weight percent) | Reduced Viscosity of Fraction | Cumulative Weight Percent of Extracted Polyethylene |
|---|---|---|---|
| 1 | 30% xylene, 70% Cellosolve | 0.12 | 3.43 |
| 2 | 40% xylene, 60% Cellosolve | 0.38 | 9.84 |
| 3 | 45% xylene, 55% Cellosolve | 0.45 | 15.48 |
| 4 | 50% xylene, 50% Cellosolve | 0.51 | 22.38 |
| 5 | 55% xylene, 45% Cellosolve | 0.67 | 38.83 |
| 6 | 60% xylene, 40% Cellosolve | 2.06 | 49.54 |
| 7 | 65% xylene, 35% Cellosolve | 3.47 | 72.19 |
| 8 | 70% xylene, 30% Cellosolve | 4.93 | 89.25 |
| 9 | 100% xylene, 0% Cellosolve | 3.99 | 97.12 |

Table F

| Fraction | Composition of Extracting Solvent (weight percent) | Reduced Viscosity of Fraction | Cumulative Weight Percent of Extracted Polyethylene |
|---|---|---|---|
| 1 | 30% xylene, 70% Cellosolve | 0.19 | 11.20 |
| 2 | 40% xylene, 60% Cellosolve | 0.24 | 18.68 |
| 3 | 45% xylene, 55% Cellosolve | 0.26 | 26.80 |
| 4 | 50% xylene, 50% Cellosolve | 0.35 | 39.43 |
| 5 | 55% xylene, 45% Cellosolve | 0.59 | 61.32 |
| 6 | 60% xylene, 40% Cellosolve | 0.85 | 81.88 |
| 7 | 65% xylene, 35% Cellosolve | 6.52 | 95.38 |
| 8 | 70% xylene, 30% Cellosolve | 8.73 | 98.64 |
| 9 | 100% xylene, 0% Celosolve | 5.90 | 100.00 |

What is claimed is:

1. A process for preparing catalyst compositions for the polymerization of ethylene which comprises (1) producing, in situ, titanium trichloride, by reducing titanium tetrachloride with a triorganoaluminum compound wherein the organo radicals are monovalent hydrocarbon radicals free of aliphatic unsaturation having from one to about eighteen carbon atoms, said titanium tetrachloride being employed in a molar ratio of from more than 3:1 to about 10:1 based on the triorganoaluminum compound employed to completely react the triorganoaluminum compound and provide an excess of titanium tetrachloride, and then (2) adding to the entire reaction mixture of step (1) a monoorganoaluminum dichloride wherein the organo radical is a monovalent hydrocarbon radical free of aliphatic unsaturation having from one to about eighteen carbon atoms in a molar ratio of about 0.1:1 to about 10:1 based on the excess titanium tetrachloride originally employed.

2. A process for preparing catalyst compositions for the polymerization of ethylene which comprises (1) producing, in situ, titanium trichloride, by reducing titanium tetrachloride with a triorganoaluminum compound wherein the organo radicals are alkyl radicals having from two to twelve carbon atoms, said titanium tetrachloride being employed in a molar ratio of from about 4:1 to about 6:1 based on the triorganoaluminum compound employed to completely react the triorganoaluminum compound and provide an excess of titanium tetrachloride, and then (2) adding to the entire reaction mixture of step (1) a monoorganoaluminum dichloride wherein the organo radical is an alkyl radical having from two to twelve carbon atoms in a molar ratio of from about 0.5:1 to about 4:1 based on the excess titanium tetrachloride compound employed.

3. A process for preparing catalyst compositions for the polymerization of ethylene which comprises (1) producing, it situ, titanium trichloride, by reducing titanium tetrachloride with a diorganoaluminum chloride wherein the organo radicals are monovalent hydrocarbon radicals free of aliphatic unsaturation having from one to about eighteen carbon atoms, said titanium tetrachloride being employed in a molar ratio of from more than 2:1 to about 10:1 based on the diorganoaluminum chloride employed to completely react the diorganoaluminum chloride and provide an excess of titanium tetrachloride, and then (2) adding to the entire reaction mixture of step (1) a monoorganoaluminum dichloride wherein the organo radical is a monovalent hydrocarbon radical free of aliphatic unsaturation having from one to about eighteen carbon atoms in a molar ratio of from about 0.1:1 to about 10:1 based on the excess titanium tetrachloride employed.

4. A process for preparing catalyst compositions for the polymerization of ethylene which comprises (1) producing, in situ, titanium trichloride, by reducing titanium tetrachloride with a diorganoaluminum chloride wherein the organo radicals are alkyl radicals having from two to twelve carbon atoms, said titanium tetrachloride being employed in a molar ratio of from about 3:1 to about 5:1 based on the diorganoaluminum chloride employed to completely react the diorganoaluminum chloride and provide an excess of titanium tetrachloride, and then (2) adding to the entire reaction mixture of step (1) a monoorganoaluminum dichloride wherein the organo radical is an alkyl radical having from two to twelve carbon atoms in a molar ratio of from about 0.5:1 to about 4:1 based on the excess titanium tetrachloride employed.

5. A process for preparing catalyst compositions for the polymerization of ethylene which comprises (1) producing, in situ, titanium trichloride, by reducing titanium tetrachloride with a monoorganoaluminum dichloride wherein the organo radical is a monovalent hydrocarbon radical free of aliphatic unsaturation having from one to about eighteen carbon atoms, said titanium tetrachloride being employed in a molar ratio of from more than 1:1 to about 10:1 based on the original monoorganoaluminum dichloride employed to completely react the monoorganoaluminum dichloride and provide an excess of titanium tetrachloride, and then (2) adding to the entire reaction mixture of step (1) additional monoorganoaluminum dichloride in a molar ratio of from about 0.1:1 to about 10:1 based on the excess titanium tetrachloride employed.

6. A process for preparing catalyst compositions for the polymerization of ethylene which comprises (1) producing, in situ, titanium trichloride, by reducing titanium tetrachloride with a monoorganoaluminum dichloride wherein the organo radical is an alkyl radical having from two to twelve carbon atoms, said titanium tetrachloride being employed in a molar ratio of from about 1.5:1 to about 3:1 based on the original monoorganoaluminum dichloride employed to completely react the monoorganoaluminum dichloride and provide an excess of titanium tetrachloride, and then (2) adding to the entire reaction mixture of step (1) additional monoorganoaluminum dichloride in a molar ratio of from about 0.5:1 to about 4:1 based on the excess titanium tetrachloride employed.

References Cited by the Examiner

UNITED STATES PATENTS

| | | | |
|---|---|---|---|
| 2,938,019 | 5/1960 | Stuart | 252—431 |
| 2,943,063 | 6/1960 | Eby et al. | 252—429 |
| 2,951,045 | 8/1960 | Gamble et al. | 252—431 |
| 2,954,637 | 9/1960 | Vandenberg | 252—429 |
| 2,962,491 | 11/1960 | Mertzweiller | 252—429 |
| 2,971,925 | 2/1961 | Winkler | 252—429 |
| 3,032,511 | 5/1962 | Langer et al. | 252—429 |
| 3,058,970 | 10/1962 | Rust et al. | 252—429 |
| 3,067,244 | 12/1962 | Robinson et al. | 252—429 |

FOREIGN PATENTS

| | | |
|---|---|---|
| 861,452 | 2/1961 | Great Britain. |
| 586,447 | 12/1958 | Italy. |

OTHER REFERENCES

Gaylord et al.: "Linear and Stereo-regular Addition Polymers," Interscience Publishers, Inc., New York, 1959, pp. 122–123.

TOBIAS E. LEVOW, *Primary Examiner.*